(12) United States Patent
Lin (10) Patent No.: US 8,370,716 B2
(45) Date of Patent: Feb. 5, 2013

(54) USB DEVICE AND CORRECTION METHOD THEREOF

(75) Inventor: Yu-Lung Lin, Taipei (TW)

(73) Assignee: VIA Technologies, Inc., Hsin-Tien, Taipei (TW)

( * ) Notice: Subject to any disclaimer, the term of this patent is extended or adjusted under 35 U.S.C. 154(b) by 565 days.

(21) Appl. No.: 12/652,174

(22) Filed: Jan. 5, 2010

(65) Prior Publication Data

US 2011/0099411 A1 Apr. 28, 2011

(30) Foreign Application Priority Data

Oct. 22, 2009 (TW) ................................ 98135736 A (51) Int. Cl.
*G11C 29/00* (2006.01)
(52) U.S. Cl. ........................................................ 714/769
(58) Field of Classification Search .................... 714/769
See application file for complete search history.

(56) References Cited

U.S. PATENT DOCUMENTS

| | | |
|---|---|---|
| 7,225,354 B2 | 5/2007 | Tseng |
| 7,346,798 B2 | 3/2008 | Tseng |
| 8,161,210 B1 * | 4/2012 | Norrie .............................. 710/65 |
| 2007/0124623 A1 * | 5/2007 | Tseng ............................ 713/503 |
| 2007/0177701 A1 * | 8/2007 | Thanigasalam ................ 375/372 |
| 2007/0214291 A1 * | 9/2007 | Castellano et al. .............. 710/29 |
| 2008/0147916 A1 * | 6/2008 | Mao .................................. 710/52 |
| 2009/0323942 A1 * | 12/2009 | Sharon et al. .................... 380/44 |

OTHER PUBLICATIONS

Universal Serial Bus 3.0 Specification, Revision 1.0, Nov. 12, 2008, Hewlett-Packard Company, Intel Corporation, Microsoft Corporation, NEC Corporation, ST-NXP Wireless, and Texas Instruments http://www.gaw.ru/pdf/interface/usb/USB%203%/200_english.pdf.*

* cited by examiner

*Primary Examiner* — Scott Baderman
*Assistant Examiner* — Neil Miles
(74) *Attorney, Agent, or Firm* — McClure, Qualey & Rodack, LLP (57) ABSTRACT

A universal serial bus (USB) device for receiving data from a link partner is provided. An electrical physical unit receives a series of data from the link partner via a cable and generates a symbol string corresponding to the series of data, wherein the symbol string includes a plurality of symbols. A correction unit receives the symbol string, determines whether each symbol of the received symbol string is a first type symbol and counts a quantity of the received first type symbol, wherein when the counted quantity is odd and a next received symbol is a second type symbol, the next received symbol is replaced with the first type symbol by the correction unit.

20 Claims, 9 Drawing Sheets

USB DEVICE AND CORRECTION METHOD THEREOF

CROSS REFERENCE TO RELATED APPLICATIONS

This Application claims priority of Taiwan Patent Application No. 098135736, filed on Oct. 22, 2009, the entirety of which is incorporated by reference herein.

BACKGROUND OF THE INVENTION

1. Field of the Invention

The invention relates to a Universal Serial Bus (USB) device, and more particularly to a USB device which is able to correct skip symbols.

2. Description of the Related Art

A Universal Serial Bus (USB) is a serial bus standard for connecting an external apparatus, providing hot plug, plug and play and other related functions.

Currently, the USB 2.0 standard provides three transfer rates: low-speed; full-speed; and high-speed transfer rates, which support: 1.5 Mbps; 12 Mbps; and 480 Mbps data rates, respectively. However, even faster transfer rates are being demanded for electronic apparatuses, due to continued advanced technological development, so that the electronic apparatuses may quickly access data from external apparatuses and subsequently perform related operations.

Therefore, the USB Implementers Forum established a next generation USB industry-standard, the USB 3.0. The USB 3.0 standard outlines allows employment of SuperSpeed data transfer and non-SuperSpeed (i.e. USB 2.0) data transfer simultaneously, wherein SuperSpeed data transfer supports a 5 Gbps data rate.

BRIEF SUMMARY OF THE INVENTION

A Universal Serial Bus (USB) device and correction method thereof are provided. An exemplary embodiment of a USB device with a first clock for receiving data from a link partner is provided. The USB device includes an electrical physical unit coupled to the link partner via a cable and a correction unit coupled to the electrical physical unit. The electrical physical unit receives a series of bit data from the link partner and generates a symbol string corresponding to the series of bit data, wherein the symbol string includes a plurality of symbols. The correction unit receives the symbol string, determines whether each symbol of the received symbol string is a first type symbol and counts a quantity of the received first type symbol, wherein when the counted quantity is odd and a next received symbol is a second type symbol, the next received symbol is replaced with the first type symbol by the correction unit, wherein the first type symbol is a skip symbol.

Furthermore, an exemplary embodiment of a correction method for a universal serial bus (USB) device with a first clock is provided. A series of bit data from a link partner are received and a symbol string corresponding to the series of bit data is generated, wherein the symbol string includes a plurality of symbols. The symbol string is received, and it is determined whether each symbol of the received symbol string is a first type symbol, and a quantity of the received first type symbol is counted, wherein the first type symbol is a skip symbol. A next received symbol is replaced with the first type symbol when the next received symbol is a second type symbol and the counted quantity is odd.

A detailed description is given in the following embodiments with reference to the accompanying drawings.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
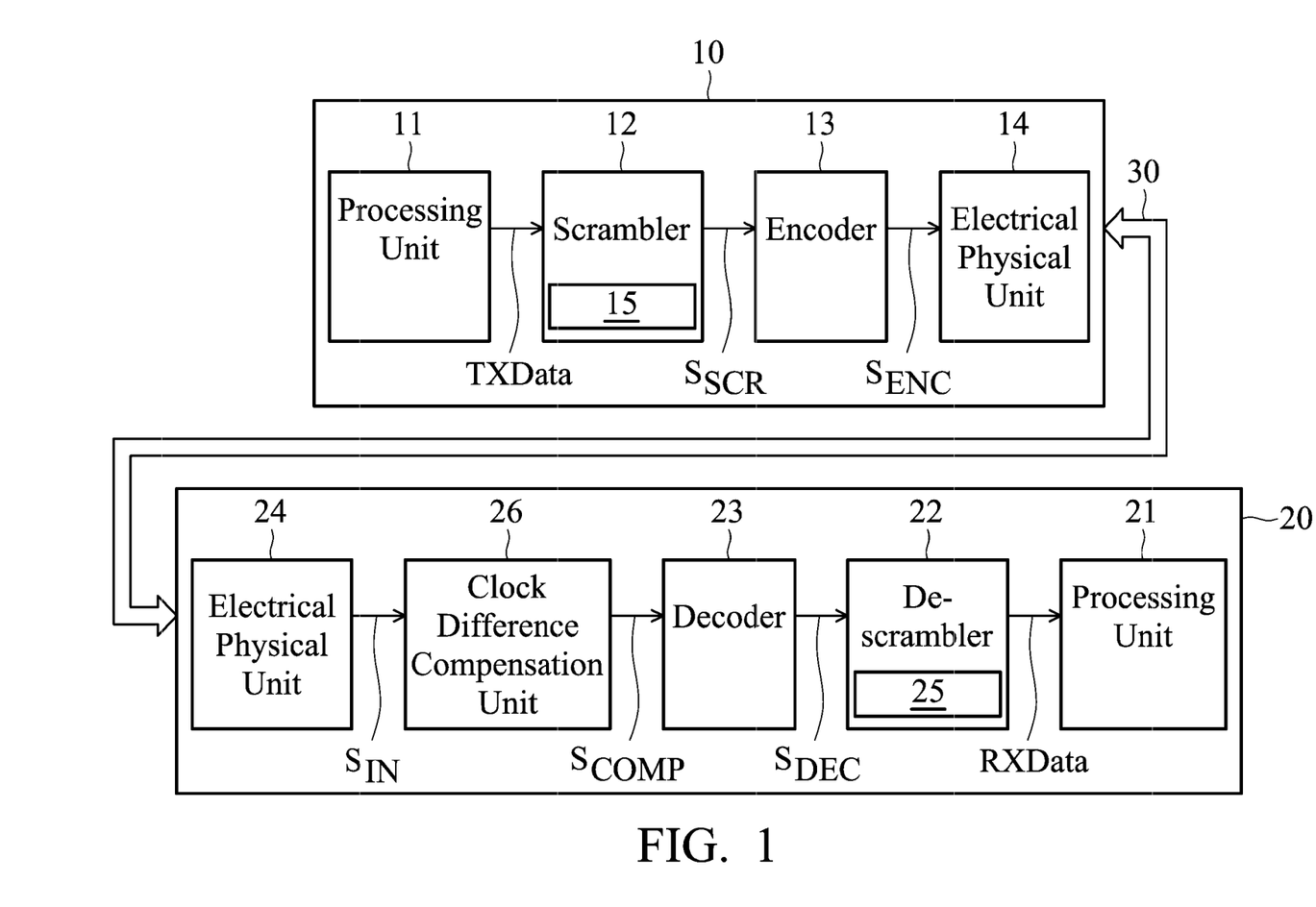
FIG. 1 shows a schematic illustrating SuperSpeed data communications between two Universal Serial Bus (USB) devices.

FIG. 1 shows a schematic illustrating SuperSpeed data communications between two Universal Serial Bus (USB) devices 10 and 20. In FIG. 1, the USB device 10 transmits data to the USB device 20 via a cable 30, wherein the USB devices 10 and 20 are link partners on the transmitting and receiving sides, respectively. The link partner 10 includes a processing unit 11, a scrambler 12, an encoder 13 and an electrical physical unit 14, wherein the scrambler 12 includes a linear feedback shifter register 15. First, the processing unit 11 provides raw data TXData to be transmitted to the scrambler 12, wherein a length of the data TXData is 8 bits. Next, the scrambler 12 scrambles the data TXData to generate scrambled data $S_{SCR}$ according to a seed provided by the linear feedback shifter register 15. Next, the encoder 13 encodes the scrambled data $S_{SCR}$ to generate encoded data $S_{ENC}$ and then transmits the encoded data $S_{ENC}$ to the electrical physical unit 14. The encoder 13 encodes the scrambled data $S_{SCR}$ using an 8b/10b encoding technique. Thus, the encoded data $S_{ENC}$ is a symbol with a 10-bit length. Next, the electrical physical unit 14 transforms the encoded data $S_{ENC}$ from parallel to serial form and then transmits the encoded data $S_{ENC}$ to the link partner 20 via the cable 30. The electrical physical unit 14 is an input/output interface unit which receives and transmits the differential signals that conform to the USB standard.

Referring to FIG. 1, the link partner 20 includes a processing unit 21, a de-scrambler 22, a decoder 23, a clock difference compensation unit 26 and an electrical physical unit 24, wherein the de-scrambler 22 includes a linear feedback shifter register 25. When a series of bit data (or bit data stream) from the link partner 10 is received by the link partner 20, the electrical physical unit 24 transforms the received bit data from serial to parallel form to generate a symbol string comprising a plurality of input data $S_{IN}$, wherein each input data $S_{IN}$ is a symbol with a 10-bit length. Next, the clock difference compensation unit 26 determines whether a compensation procedure is required to be performed or not according to a clock difference between a first clock of the link partner 20 and a second clock of the link partner 10, so as to synchronize the transmitted data rate of the link partner 10 and the received data rate of the link partner 20. When the clock difference between the first and second clocks is small, the clock difference compensation unit 26 directly passes the input data $S_{IN}$ to the decoder 23 without performing a compensation procedure, i.e. the data $S_{COMP}$ is identical to the $S_{IN}$. Therefore, the data $S_{COMP}$ of the link partner 20 is identical to the encoded data $S_{ENC}$ of the link partner 10 when there is no distortion between the data communication of the link partners 10 and 20. Next, the decoder 23 decodes the data $S_{COMP}$ using an 8b/10b decoding technique to generate data $S_{DEC}$. Meanwhile, the decoded data $S_{DEC}$ of the link partner 20 is identical to the data $S_{SCR}$ of the link partner 10 when the data communication between the link partners 10 and 20 is correct. Next, the de-scrambler 22 de-scrambles the decoded data $S_{DEC}$ according to a seed provided by the linear feedback shifter register 25 to generate the data RXData and transmit the data RXData to the processing unit 21 for subsequent applications of the processing unit 21.

In FIG. 1, the seed within the scrambler 12 of link partner 10 is synchronous to the seed within the de-scrambler 22 of link partner 20 in order to accurately recover the raw data TXData of the link partner 10. The linear feedback shifter registers 15 and 25 simultaneously provide seeds to the scrambler 12 and the de-scrambler 22 according to a specific manner, such as a specific lookup table or a specific algorithm. Therefore, after the linear feedback shifter registers 15 and 25 are simultaneously initialized, the seeds of the linear feedback shifter registers 15 and 25 are synchronized to change, i.e. the linear feedback shifter registers 15 and 25 have the same seeds. In addition, in the USB 3.0 specification, a correction symbol (COM) (or so-called comma symbol) is disclosed to initialize the linear feedback shifter registers of scrambler/de-scrambler, so as to initialize the seed of the linear feedback shifter register within each link partner. Therefore, the linear feedback shifter register 15 of the link partner 10 and the linear feedback shifter register 25 of the link partner 20 are synchronized by the COM symbol before data communications between the link partners 10 and 20. Furthermore, the USB 3.0 specification also discloses that a skip symbol (SKP) should be used to stop updating the seed of the linear feedback shifter register within each link partner, thus keeping the content of seed. The character symbol code of the skip symbol includes "0011111001" and "1100000110". In general, the linear feedback shifter register scrambler/de-scrambler seeds are updated by other types of symbols except for the correction symbol and the skip symbol.

Figure 2:
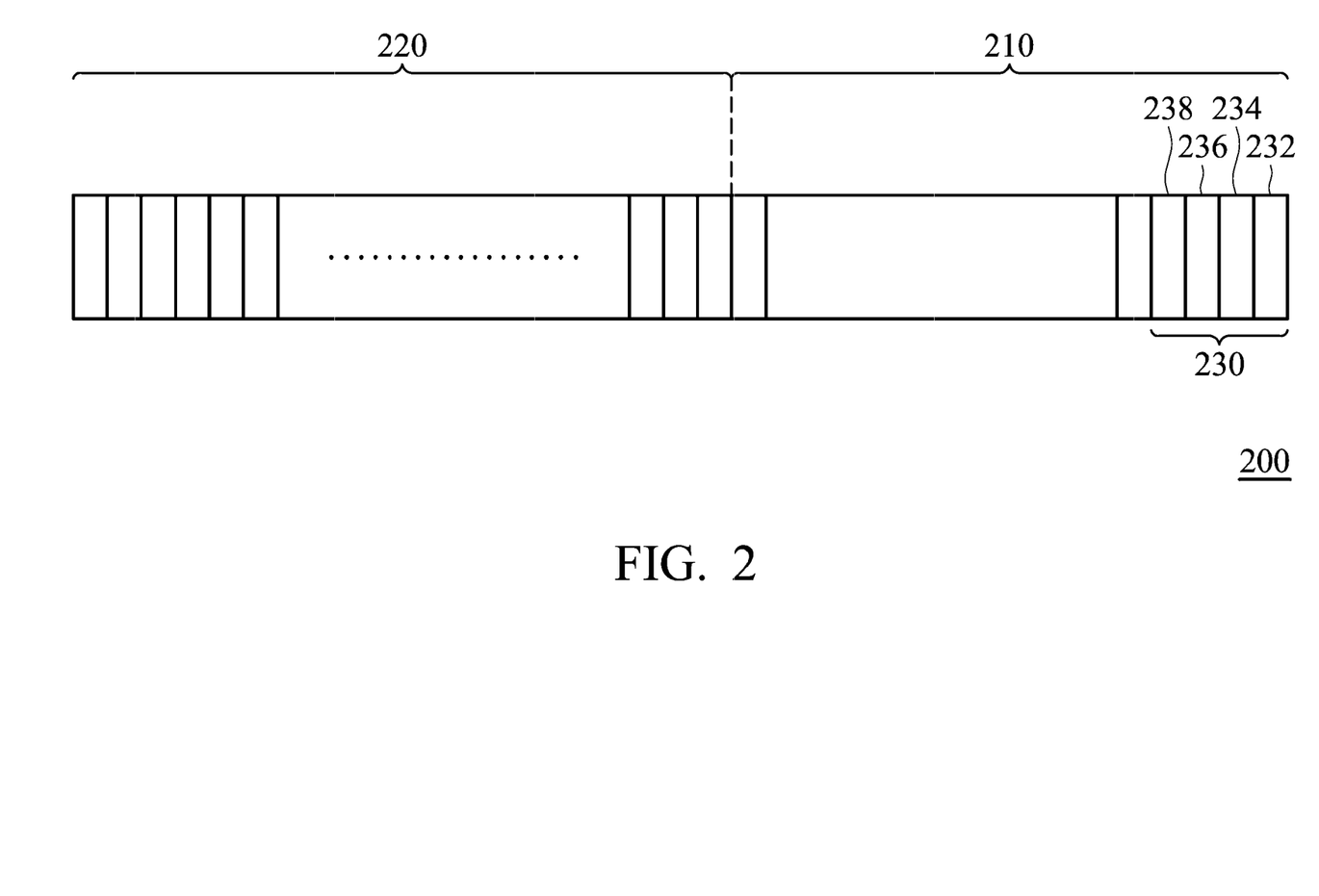
FIG. 2 shows a data packet which conforms to the USB 3.0 specification.

FIG. 2 shows a data packet 200 which conforms to the USB 3.0 specification. The data packet 200 includes a data packet header 210 and a data packet payload 220, wherein the data packet header 210 and the data packet payload 220 are composed of a plurality of symbols. In the data packet header 210, a header packet framing 230 includes the symbols 232, 234, 236 and 238, wherein the symbol 232 is the first symbol to be transmitted within the data packet 200. Furthermore, one symbol error tolerance is allowed for the header packet framing 230. Therefore, if one symbol of the header packet framing 230 is incorrect (or corrupted) and the other three symbols are correct during the data communication, the data packet 200 is still considered as a valid data for the link partner on the receiving side. In addition, at least one skip ordered set is transmitted between two data packets by the link partner on the transmitting side, so as to compensate for a clock difference (or different bit rates) between the link partner on the receiving side and the link partner on the transmitting side. In the USB 3.0 specification, a skip ordered set (or so-called SKP ordered set) includes two skip symbols. For example, a first skip symbol is "0011111001" and a second skip symbol is "1100000110", or a first skip symbol is "1100000110" and a second skip symbol is "0011111001". Furthermore, according to the USB 3.0 specification, the link partner on the transmitting side transmits one skip ordered set to the link partner on the receiving side at an average of every 354 symbols. However, no skip ordered set is inserted within any data packet. Thus, the link partner on the transmitting side is allowed to buffer the skip ordered sets during data packet communications. After the data packet communication is completed, the link partner on the transmitting side transmits the buffered skip ordered sets to the link partner on the receiving side. In addition, the link partner on the receiving side may increase or decrease the amount of the skip ordered sets to avoid asynchronous clocks between the two link partners.

Figure 3A:
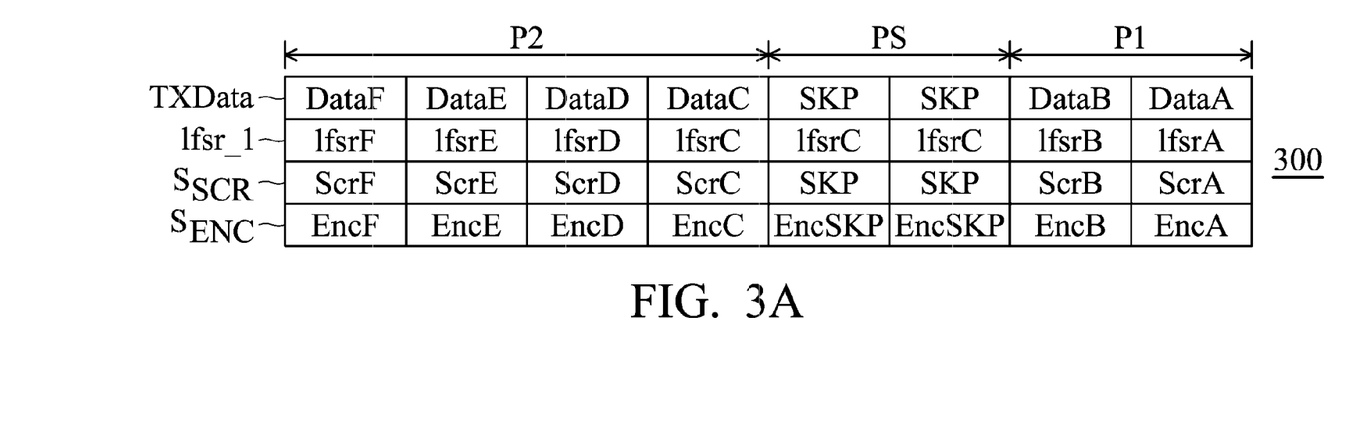
FIG. 3A shows a data table illustrating the data within the link partner on the transmitting side of FIG. 1.

FIG. 3A shows a data table 300 illustrating the data within the link partner 10 of FIG. 1. Referring to FIG. 1 and FIG. 3A together, the link partner 10 transmits a data packet P1, a skip ordered set PS and a data packet P2 to the link partner 20 in sequence. In the data table 300, the TXData provided by the processing unit 11 is shown in the first row. The seeds lfsr_1 provided by the linear feedback shifter register 15 are shown in the second row of the data table 300. The scrambled data $S_{SCR}$ provided by the scrambler 12 are shown in the third row of the data table 300, which are generated according to the seeds lfsr_1 and the TXData. The encoded data $S_{ENC}$ provided by the encoder 13 are shown in the fourth row of the data table 300. Data EncA and EncB are the last two symbols of the data packet P1, and Data EncC, EncD, EncE and EncF are the forward four symbols of the data packet P2, i.e. a header packet framing of the data packet P2. Taking the data DataA as an example, the scrambler 12 provides the scramble data ScrA according to the data DataA and the seed lfsrA. Next, the encoder 13 encodes the scramble data ScrA to generate the data EncA. It is to be noted that the skip data SKP is not scrambled by the scrambler 12. Furthermore, if data to be scrambled is not skip data, the linear feedback shifter register 15 will update the seed lfsr_1 for a next data after the data is scrambled by the scrambler 12. For example, the linear feedback shifter register 15 updates the seed to the value lfsrC after the data DataB is scrambled. Therefore, when the scrambler 12 receives a first skip data SKP of the skip ordered set PS, the scrambler 12 does not scramble the first skip data SKP with the value lfsrC and the scrambler 12 directly passes the first skip data SKP to the encoder 13. Moreover, because the first skip data SKP has been received, the linear feedback shifter register 15 does not update the seed. Thus, the seed is not changed and kept at the value lfsrC. Next, the encoder 13 encodes the first skip data SKP to generate a first skip symbol EncSKP. Next, when the scrambler 12 receives a second skip data SKP of the skip ordered set PS, the scrambler 12 directly passes the second skip data SKP to the encoder 13, wherein the seed is still not changed and kept at the value lfsrC. Next, the encoder 13 encodes the second skip data SKP to generate a second skip symbol EncSKP.

Figure 3B:
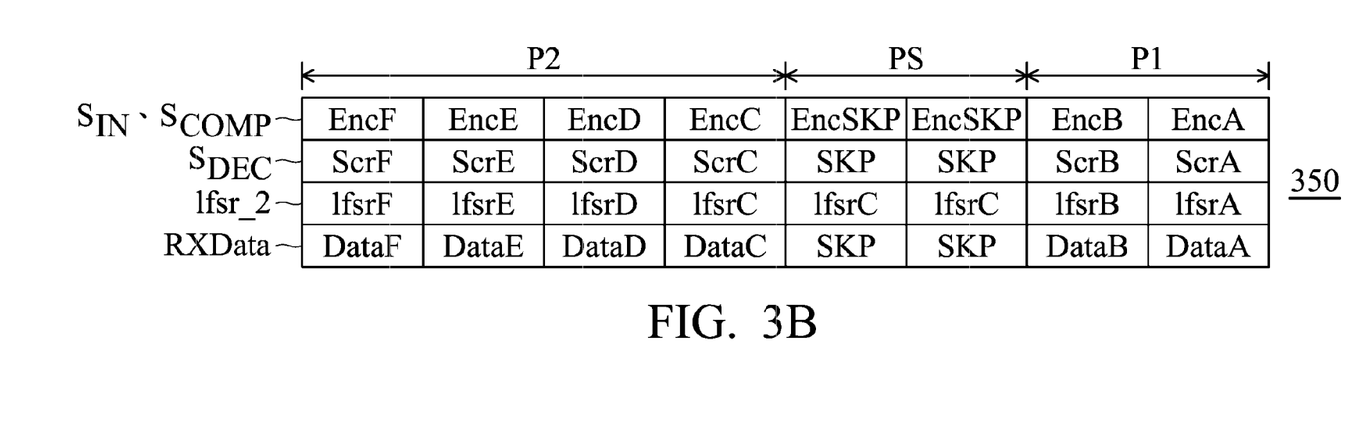
FIG. 3B shows a data table illustrating the data within the link partner on the receiving side of FIG. 1.

FIG. 3B shows a data table 350 illustrating the data within the link partner 20 of FIG. 1. The data table 350 corresponds to the data that is transmitted according to the data table 300 of FIG. 3A. Referring to FIG. 1, FIG. 3A and FIG. 3B together, the link partner 20 receives the data packet P1, the skip ordered set PS and the data packet P2 from the link partner 10 in sequence. In the data table 350, the input data $S_{IN}$ received by the electrical physical 24 is shown in the first row. Furthermore, in the embodiment, the clock difference compensation unit 26 directly transmits the input data $S_{IN}$ to the decoder 23 as no compensation procedure is required, i.e. the data $S_{COMP}$ is identical to the $S_{IN}$. The decoded data $S_{DEC}$ provided by the decoder 23 is shown in the second row of the data table 350. The seeds lfsr_2 provided by the linear feedback shifter register 25 are shown in the third row of the data table 350. The de-scrambled data RXData provided by the de-scrambler 22 according to the seeds lfsr_2 and the decoded data $S_{DEC}$ are shown in the fourth row of the data table 350. If the data communication between the link partners 10 and 20 is correct, the input data $S_{IN}$ received by the electrical physical unit 24 of the link partner 20 is identical to the encoded data $S_{ENC}$ provided by the encoder 13 of the link partner 10. Therefore, the first row of the data table 350 in FIG. 3B and the fourth row of the data table 300 in FIG. 3A are the same. Taking the input data EncA as an example, the decoder 23 decodes the data EncA to generate the decoded data ScrA. As described above, the second row of the data table 350 in FIG. 3B and the third row of the data table 300 in FIG. 3A are the same when the data communication between the link partners 10 and 20 is correct. Next, the de-scrambler 22 obtains the de-scrambled data DataA according to the decoded data ScrA and the seed lfsrA. Therefore, the processing unit 21 of the link partner 20 may accurately receive the data TXData provided by the link partner 10. It is to be noted that the seed lfsr_2 of the data table 350 in FIG. 3B is synchronized to the seed lfsr_1 of the data table 300 in FIG. 3A, so as to accurately recover the raw data TXData provided by the link partner 10 for the link partner 20.

Figures 4A, 4B:
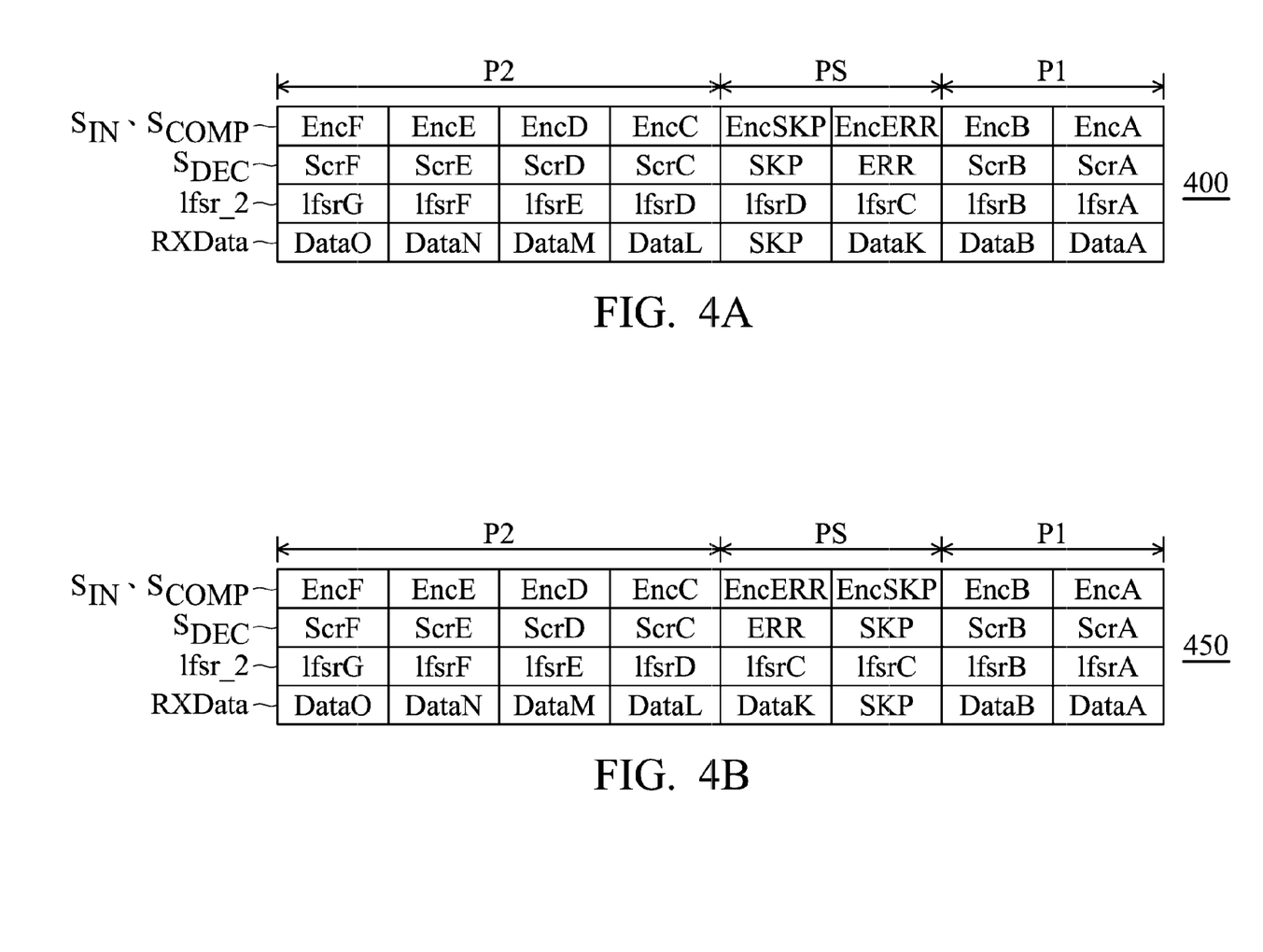
FIG. 4A show a data table illustrating that the first skip symbol of FIG. 3B is incorrect.
FIG. 4B show a data table illustrating that the second skip symbol of FIG. 3B is incorrect.

FIG. 4A and FIG. 4B show a data table 400 and a data table 450, respectively, wherein the data table 400 represents a situation illustrating that the first skip symbol of FIG. 3B is incorrect, and the data table 450 represents a situation illustrating that the second skip symbol of FIG. 3B is incorrect. Referring to FIG. 1 and FIG. 4A together, when the first skip symbol received by the electrical physical unit 24 of the link partner 20 is incorrect (shown as the data EncERR in the data table 400), the decoder 23 can not identify that the data EncERR is a skip symbol. Therefore, the decoder 23 decodes the data EncERR to generate the data ERR. Next, the de-scrambler 22 de-scramblers the data ERR to obtain the de-scrambled data DataK according to the seed lfsrC. After the de-scrambled data DataK is generated, the linear feedback shifter register 25 updates the seed to the value lfsrD. Next, when the second skip symbol EncSKP is received by the link partner 20, the decoder 23 decodes the data EncSKP to generate the skip data SKP, and then the de-scrambler 22 directly transmits the skip data SKP to the processing unit 21, wherein the linear feedback shifter register 25 does not update the seed such that the seed is not changed and kept at the value lfsrD. When the second skip symbol from the link partner 10 is processed by the link partner 20, the seed lfsr_2 of the data table 400 in FIG. 4A is asynchronous to the seed lfsr_1 of the data table 300 in FIG. 3A. Thus, the link partner 20 can not accurately de-scramble and recover subsequent data provided by the link partner 10. For example, the de-scrambler 22 obtains the data DataL, DataM, DataN and DataO according to the seeds lfsrD, lfsrE, lfsrF and lfsrG, respectively. Thus, the link partner 20 can not recover the data Data C, DataD, DataE and DataF. The link partners 10 and 20 require additional time to re-link therebetween and synchronize seeds therein when no correct data is received by the link partner 20. Similarly, referring to FIG. 4B, when the second skip symbol EncSKP from the link partner 10 received by the link partner 20 is incorrect (shown as the data EncERR in the data table 450), the seeds of the link partners 10 and 20 are asynchronous. Thus, the link partner 20 can not accurately de-scramble and recover subsequent data provided by the link partner 10.

Figure 5:
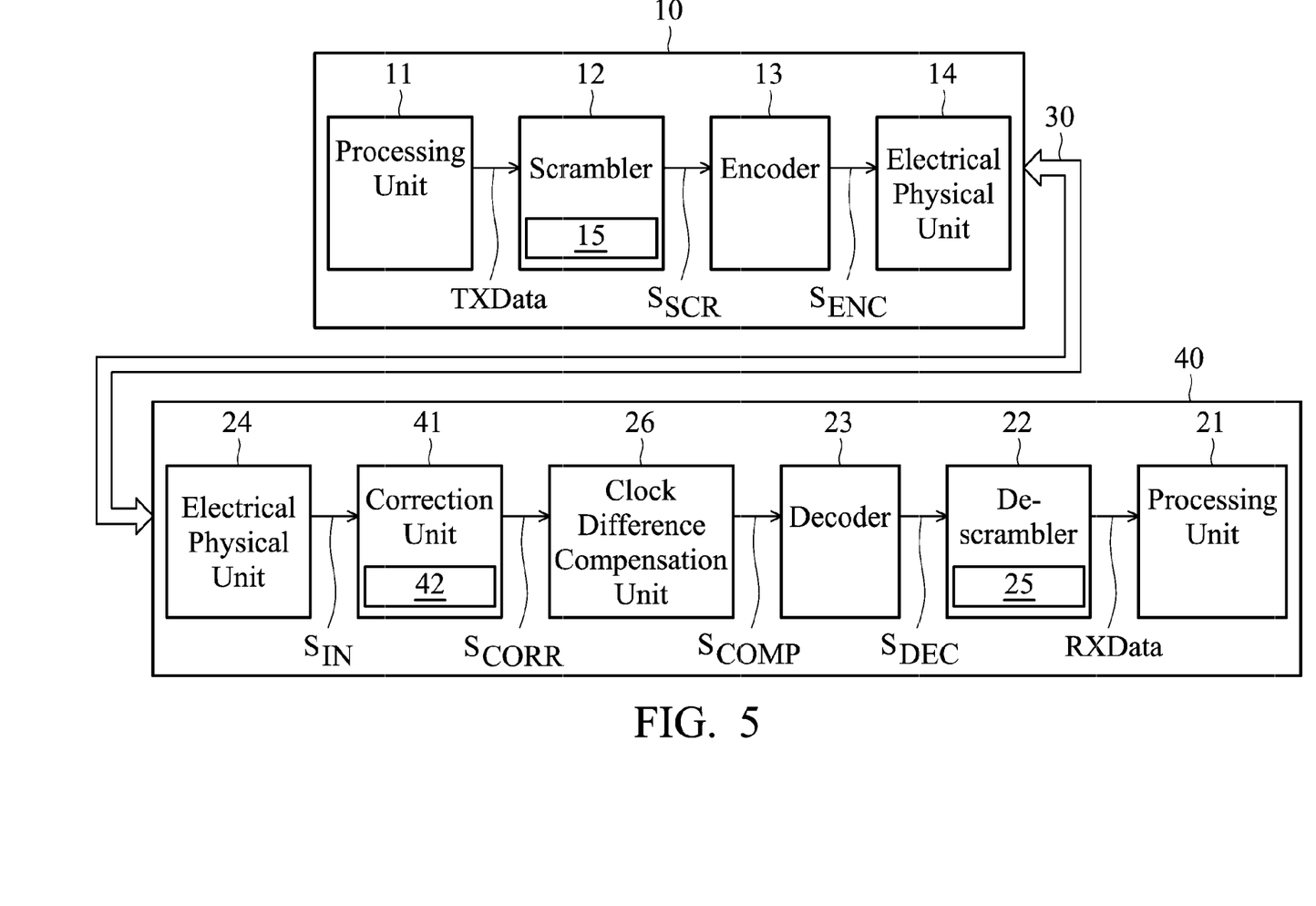
FIG. 5 shows a USB device according to an embodiment of the invention.

FIG. 5 shows a USB device 40 according to an embodiment of the invention. In FIG. 5, the USB device 10 transmits data to the USB device 40 via the cable 30. The link partner 10 provides data to the link partner 40 according to a second clock and the link partner 40 processes the data from the link partner 10 according to a first clock. When compared to the link partner 20 of FIG. 1, the link partner 40 further includes a correction unit 41 coupled between the electrical physical unit 24 and the clock difference compensation unit 26. The correction unit 41 receives the input data $S_{IN}$ from the electrical physical unit 24 and provides the correction data $S_{CORR}$ to the clock difference compensation unit 26 according to the received data $S_{IN}$. In FIG. 5, the correction unit 41 includes a counter 42. The correction unit 41 determines whether the received data $S_{IN}$ is a skip symbol or not and uses the counter 42 to count a quantity of the received skip symbol. For example, two skip symbols are counted by the counter 42 when the electrical physical unit 24 accurately receives a skip ordered set from the link partner 10. However, when there is interference in the cable 30, the skip ordered set may be interfered with during the data communication between the link partners 10 and 40, such that only one skip symbol is counted by the counter 42, as shown in data EncERR of FIGS. 4A and 4B. Therefore, when odd numbers of the skip symbols are counted by the counter 42 and a next received input data $S_{IN}$ is a non-skip symbol which is a symbol different from the skip symbol, the correction unit 41 performs a correction procedure to replace the non-skip symbol with a skip symbol and outputs the replaced symbol to the clock difference compensation unit 26. Thus, the clock difference compensation unit 26 receives even numbered skip symbols.

Figure 6A:
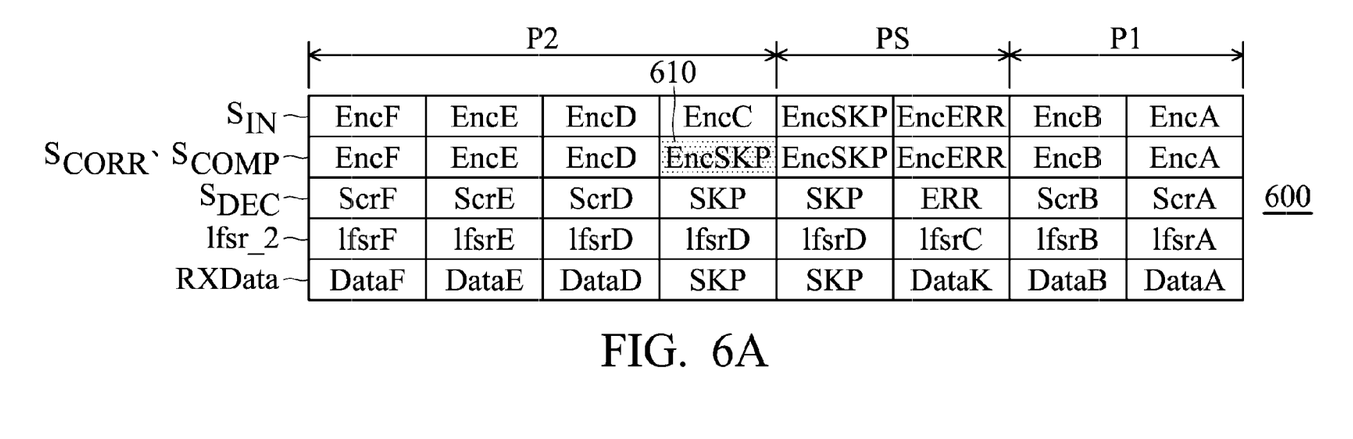
FIG. 6A shows a data table according to an embodiment of the invention, which illustrates the data within the link partner on the receiving side of FIG. 5.

FIG. 6A shows a data table 600 according to an embodiment of the invention, which illustrates the data within the link partner 40 of FIG. 5. The data table 600 corresponds to the data that is transmitted according to the data table 300 of FIG. 3A. Referring to FIG. 5 and FIG. 6A together, the link partner 40 receives the data packet P1, the skip ordered set PS and the data packet P2 from the link partner 10 in sequence. In the data table 600, the input data $S_{IN}$ received by the electrical physical 24 is shown in the first row. The correction data $S_{CORR}$ provided by the correction unit 41 according to the input data $S_{IN}$ from the electrical physical 24 is shown in the second row of the data table 600. In the embodiment, the clock difference between the second clock of the link partner 10 and the first clock of the link partner 20 is small, thus no compensation procedure is required. Therefore, the clock difference compensation unit 26 directly passes the correction data $S_{CORR}$ to the decoder 23, i.e. the correction data $S_{CORR}$ is identical to the $S_{COMP}$. The decoded data $S_{DEC}$ provided by the decoder 23 according to the $S_{COMP}$ is shown in the third row of the data table 600. The seeds lfsr_2 provided by the linear feedback shifter register 25 are shown in the fourth row of the data table 600. The de-scrambled data RXData provided by the de-scrambler 22 according to the seeds lfsr_2 and the decoded data $S_{DEC}$ are shown in fifth row of the data table 600. Taking the input data EncA as an example, when it is determined that the input data EncA is not a skip symbol, the correction unit 41 directly passes the data EncA to the clock difference compensation unit 26 without performing a compensation procedure. Next, the data EncA is recovered to the data DataA by the decoder 23 and the de-scrambler 22. In the data table 600, the first skip symbol of the skip ordered set PS received by the electrical physical unit 24 of the link partner 40 is incorrect (shown as the data EncERR in the data table 600). Thus, the correction unit 41 can not determine whether the data EncERR is a skip symbol. Therefore, the correction unit 41 directly passes the data EncERR to the clock difference compensation unit 26 for subsequent processing. Next, the de-scrambler 22 de-scrambles the data EncERR to generate the data DataK. Next, when the electrical physical unit 24 receives the second skip symbol of the skip ordered set PS, the correction unit 41 determines that the data EncSKP is a skip symbol and then enables the counter 42 to count a quantity of successively received skip symbols. Next, when the electrical physical unit 24 receives the data EncC, the correction unit 41 determines that the data EncC is not a skip symbol and then the correction unit 41 determines whether a correction procedure is required to be performed or not according to the counted quantity provided by the counter 42, wherein the data EncC is a next data following the data EncSKP. In the embodiment, the counted quantity provided by the counter 42 is 1 (odd). Therefore, the correction unit 41 replaces the data EncC with a skip symbol EncSKP (as shown in label 610) and provides the skip symbol EncSKP to the clock difference compensation unit 26 for subsequent processing, wherein the linear feedback shifter register 25 does not update the seed and the seed is not changed and kept at the value lfsrD. In addition, after the data EncC is replaced with the skip symbol EncSKP by the correction unit 41, the correction unit 41 resets the counter 42 to re-count the quantity of the received skip symbols. Next, when the data EncD is received by the electrical physical 24, the correction unit 41 determines that the data EncD is not a skip symbol, and then the correction unit 41 directly passes the data EncD to the clock difference compensation unit 26 for subsequent processing. Thus, the decoder 23 decodes the data EncD to generate the data ScrD, and the de-scrambler 22 receives the data ScrD to accurately recover the data DataD according to the seed lfsrD. Therefore, the seeds provided by the linear feedback shifter registers 15 and 25 are synchronous due to performance of the correction procedure for the correction unit 41. In addition, because one symbol error tolerance is allowed within a header packet framing, a header packet framing of the data packet P2 is detected by the processing unit 21 according to the data DataD, DataE and DataF, and then the data packet P2 is treated as a valid data for the link partner 40. Therefore, the data packet P2 is accurately received by the processing unit 21 after the correction procedure is performed by the correction unit 41.

Figure 6B:
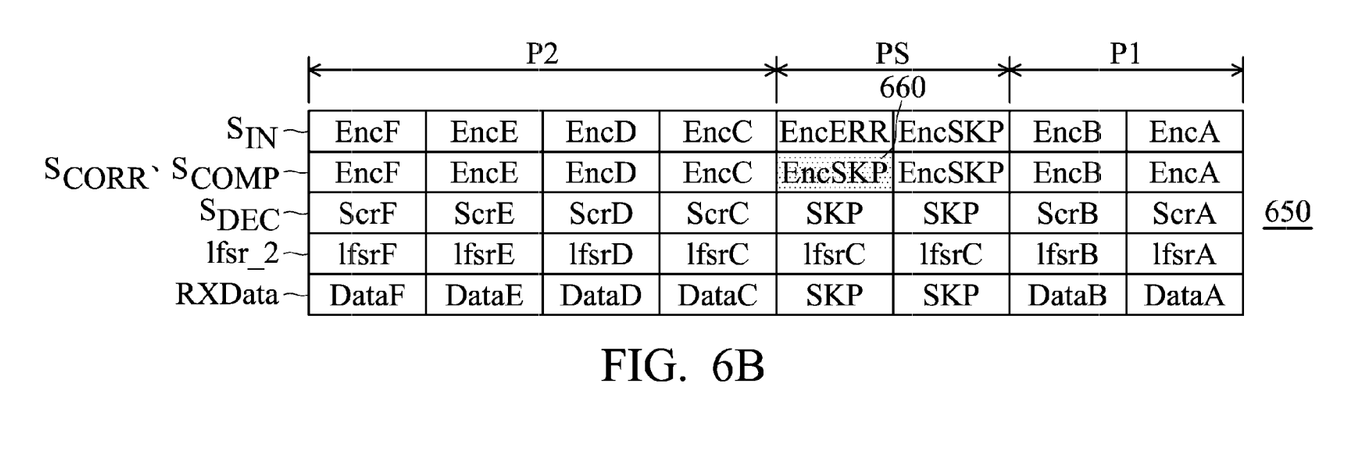
FIG. 6B shows a data table according to another embodiment of the invention, which illustrates the data within the link partner on the receiving side of FIG. 5.

FIG. 6B shows a data table 650 according to another embodiment of the invention, which illustrates the data within the link partner 40 of FIG. 5. The data table 650 corresponds to the data that is transmitted according to the data table 300 of FIG. 3A. Compared to the data table 600 of FIG. 6A, the data table 650 illustrates a correction procedure being performed by the correction unit 41 when the second skip symbol of the skip ordered set PS received by the electrical physical unit 24 is incorrect. The correction unit 41 replaces the data EncERR with a skip symbol EncSKP (as shown in label 660) and provides the skip symbol EncSKP to the clock difference compensation unit 26 for subsequent processing. Next, subsequent data DataC, DataD, DataE and DataF are correctly recovered. Therefore, the seeds provided by the linear feedback shifter registers 15 and 25 are synchronous due to performance of the correction procedure with the correction unit 41 to correct the corrupted skip symbol, so that the data transmitted from the link partner 10 are correctly received for the processing unit 21.

When a plurality of skip ordered sets PS are transmitted between a first data packet (P1) and a second data packet (P2) by the link partner 10, the correction unit 41 uses the counter 42 to count a quantity of the successively received skip symbols. For example, when the correction unit 41 determines that a next data following the skip data EncSKP is not a skip symbol and the counted quantity provided by the counter 42 is odd, the correction unit 41 replaces the next data with a skip symbol EncSKP, provides the skip symbol EncSKP to the clock difference compensation unit 26 and resets the counter 42. Therefore, if there is a corrupted skip symbol within the skip ordered sets PS, the correction unit 41 may perform the correction procedure to output even numbers of the skip symbols to the clock difference compensation unit 26.

Figure 7A:
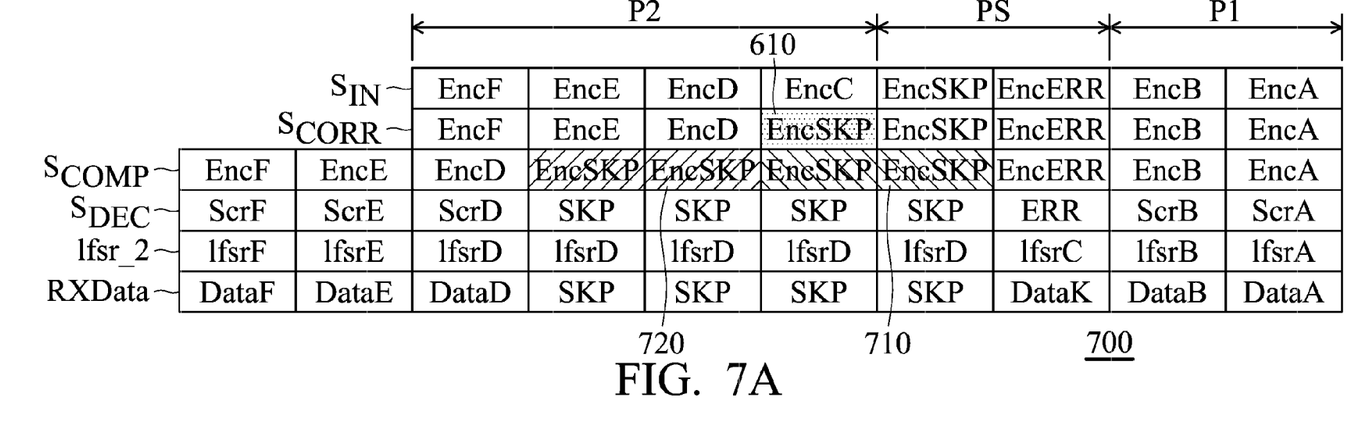
FIGS. 7A, 7B, 8A and 8B show various data tables according to various embodiments of the invention, which illustrate the data within the link partner on the receiving side of FIG. 5, respectively.

FIG. 7A shows a data table 700 according to another embodiment of the invention, which illustrates the data within the link partner 40 of FIG. 5. The data table 700 corresponds to the data that is transmitted according to the data table 300 of FIG. 3A. The data table 700, illustrates a correction procedure being performed by the correction unit 41 and a compensation procedure being performed by the clock difference compensation unit 26 when the first skip symbol of the skip ordered set PS received by the electrical physical unit 24 is incorrect and the clocks of the link partner 10 and 40 have a large frequency difference. In the embodiment, frequency of the first clock of the link partner 40 is larger than that of the second clock of the link partner 10. Thus, transmitted data rate of the link partner 10 and received data rate of the link partner 20 are asynchronous. Therefore, the clock difference compensation unit 26 performs the compensation procedure to compensate for the clock difference between the first and second clocks by increasing the amount of the skip ordered sets between the data packets P1 and P2. Referring to FIG. 5 and FIG. 7A together, in the data table 700, the input data $S_{IN}$ received by the electrical physical 24 is shown in the first row. The correction data $S_{CORR}$ provided by the correction unit 41 according to the input data $S_{IN}$ from the electrical physical 24 is shown in the second row of the data table 700. The data $S_{COMP}$ provided by the clock difference compensation unit 26 is shown in the third row of the data table 700. The decoded data $S_{DEC}$ provided by the decoder 23 is shown in the fourth row of the data table 700. The seeds lfsr_2 provided by the linear feedback shifter register 25 are shown in fifth row of the data table 700. The de-scrambled data RXData provided by the de-scrambler 22 according to the seeds lfsr_2 and the decoded data $S_{DEC}$ is shown in sixth row of the data table 700. As described above, when the correction unit 41 determines that a next data following the skip data EncSKP is not a skip symbol and the counted quantity provided by the counter 42 is odd, the correction unit 41 replaces the next data with a skip symbol EncSKP (as shown in label 610) and provides the skip symbol EncSKP to the clock difference compensation unit 26. Next, after receiving a skip ordered set 710 from the correction unit 41, the clock difference compensation unit 26 provides a skip ordered set 720 to the decoder 23, and then the data EncD, EncE and EncF are passed to the decoder 23 for subsequent processing. In the embodiment, the header packet framing of the data packet P2 is detected by the processing unit 21 according to the data DataD, DataE and DataF, and then the data packet P2 is treated as a valid data for the link partner 40. Therefore, the data packet P2 is received by the processing unit 21 accurately after the correction procedure is performed by the correction unit 41 and the compensation procedure is performed by the clock difference compensation unit 26.

Figure 7B:
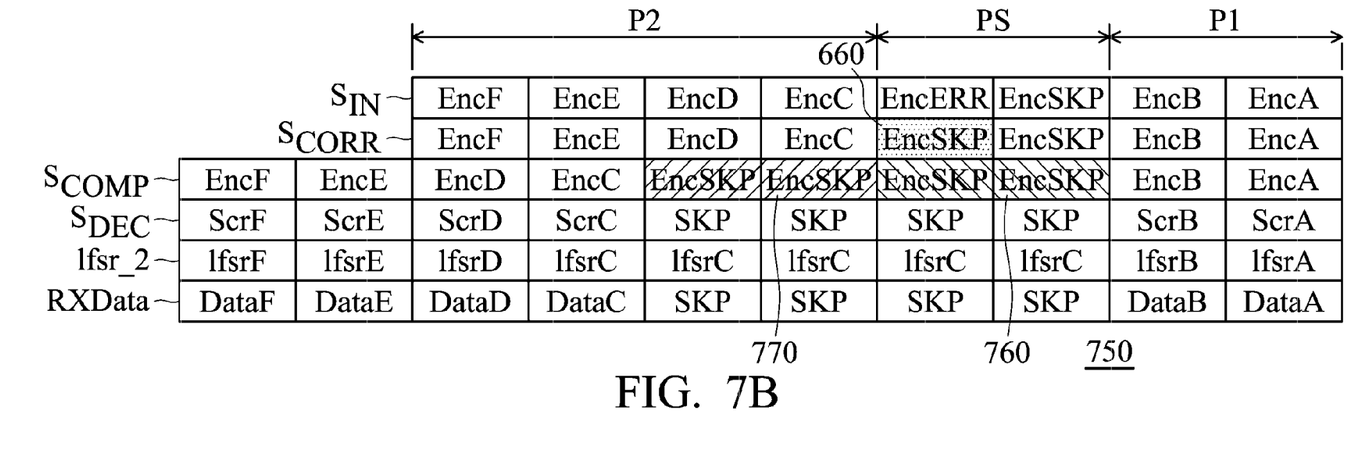

FIG. 7B shows a data table 750 according to another embodiment of the invention, which illustrates the data within the link partner 40 of FIG. 5. The data table 750 corresponds to the data that is transmitted according to the data table 300 of FIG. 3A. The data table 750, illustrates a correction procedure being performed by the correction unit 41 and a compensation procedure being performed by the clock difference compensation unit 26 when the second skip symbol of the skip ordered set PS received by the electrical physical unit 24 is incorrect and the clocks of the link partner 10 and 40 have a large frequency difference. In the embodiment, the frequency of the first clock of the link partner 40 is larger than that of the second clock of the link partner 10. Similarly, after receiving a skip ordered set 760 from the correction unit 41, the clock difference compensation unit 26 provides a skip ordered set 770 following the skip ordered set 760 to the decoder 23, and then the data EncC, EncD, EncE and EncF are passed to the decoder 23 for subsequent processing. In the embodiment, the header packet framing (DataC, DataD, DataE and DataF) of the data packet P2 is received by the processing unit 21 completely, and then the data packet P2 is treated as a valid data for the link partner 40. Therefore, the data packet P2 is received by the processing unit 21 accurately after the correction procedure is performed by the correction unit 41 and the compensation procedure is performed by the clock difference compensation unit 26.

Figure 8A:
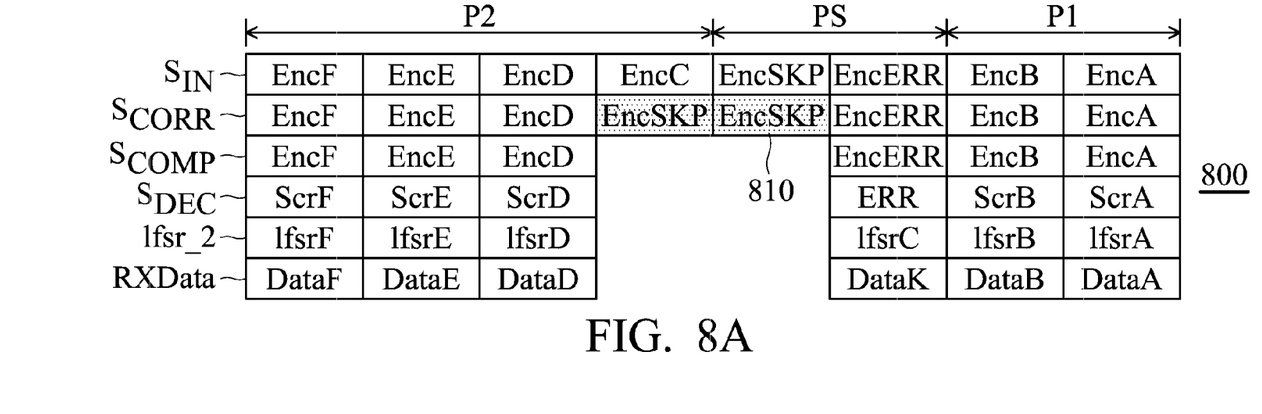

FIG. 8A shows a data table 800 according to another embodiment of the invention, which illustrates the data within the link partner 40 of FIG. 5. The data table 800 corresponds to the data that is transmitted according to the data table 300 of FIG. 3A. The data table 800 illustrates a correction procedure being performed by the correction unit 41 and a compensation procedure being performed by the clock difference compensation unit 26 when the first skip symbol of the skip ordered set PS received by the electrical physical unit 24 is incorrect and the clocks of the link partner 10 and 40 have a large frequency difference. In the embodiment, the frequency of the first clock of the link partner 40 is smaller than that of the second clock of the link partner 10. Therefore, the clock difference compensation unit 26 performs the compensation procedure to compensate for the clock difference between the first and second clocks by decreasing the amount of the skip ordered sets between the data packets P1 and P2. As described above, when the correction unit 41 determines that a next data following the skip data EncSKP is not a skip symbol and the counted quantity provided by the counter 42 is odd, the correction unit 41 replaces the next data with a skip symbol EncSKP and provides the skip symbol EncSKP to the clock difference compensation unit 26. Next, after receiving a skip ordered set 810 from the correction unit 41, the clock difference compensation unit 26 does not provide the skip ordered set 810 to the decoder 23. Next, after receiving the data EncD, the clock difference compensation unit 26 starts to output the data EncD to the decoder 23 for subsequent processing. In the embodiment, the header packet framing of the data packet P2 is detected by the processing unit 21 according to the data DataD, DataE and DataF, and then the data packet P2 is considered as a valid data for the link partner 40. Therefore, the data packet P2 is accurately received by the processing unit 21 after the correction procedure is performed by the correction unit 41 and the compensation procedure is performed by the clock difference compensation unit 26.

Figure 8B:
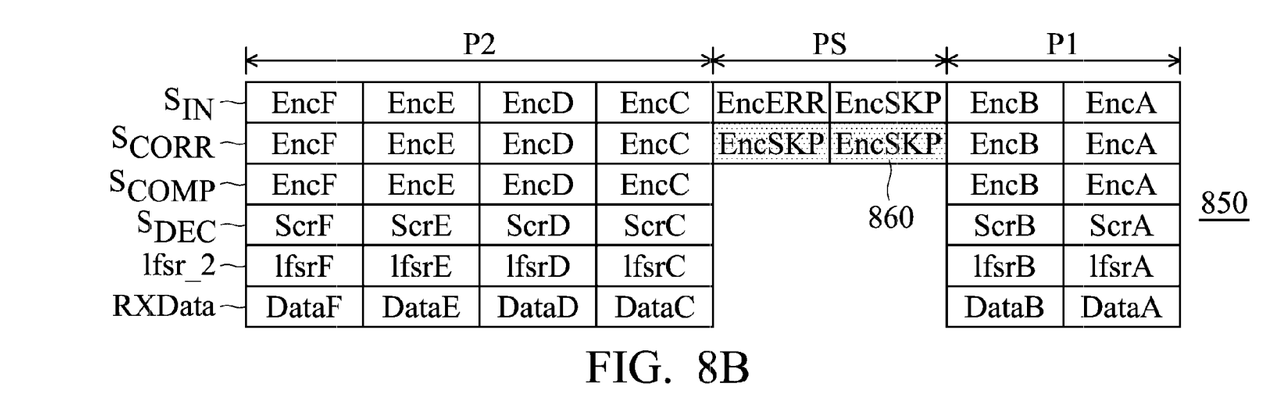

FIG. 8B shows a data table 850 according to another embodiment of the invention, which illustrates the data within the link partner 40 of FIG. 5. The data table 850 corresponds to the data that is transmitted according to the data table 300 of FIG. 3A. The data table 850 illustrates a correction procedure being performed by the correction unit 41 and a compensation procedure being performed by the clock difference compensation unit 26 when the second skip symbol of the skip ordered set PS received by the electrical physical unit 24 is incorrect and the clocks of the link partner 10 and 40 have a large frequency difference. In the embodiment, the frequency of the first clock of the link partner 40 is smaller than that of the second clock of the link partner 10. Similarly, after receiving a skip ordered set 860 from the correction unit 41, the clock difference compensation unit 26 does not provide the skip ordered set 860 to the decoder 23. Next, after receiving the data EncC, the decoder 26 starts to output the data EncC to the decoder 23 for subsequent processing. In the embodiment, the header packet framing (DataC, DataD, DataE and DataF) of the data packet P2 is completely received by the processing unit 21. Therefore, the data packet P2 is accurately received by the processing unit 21 after the correction procedure is performed by the correction unit 41 and the compensation procedure is performed by the clock difference compensation unit 26.

Figure 9:
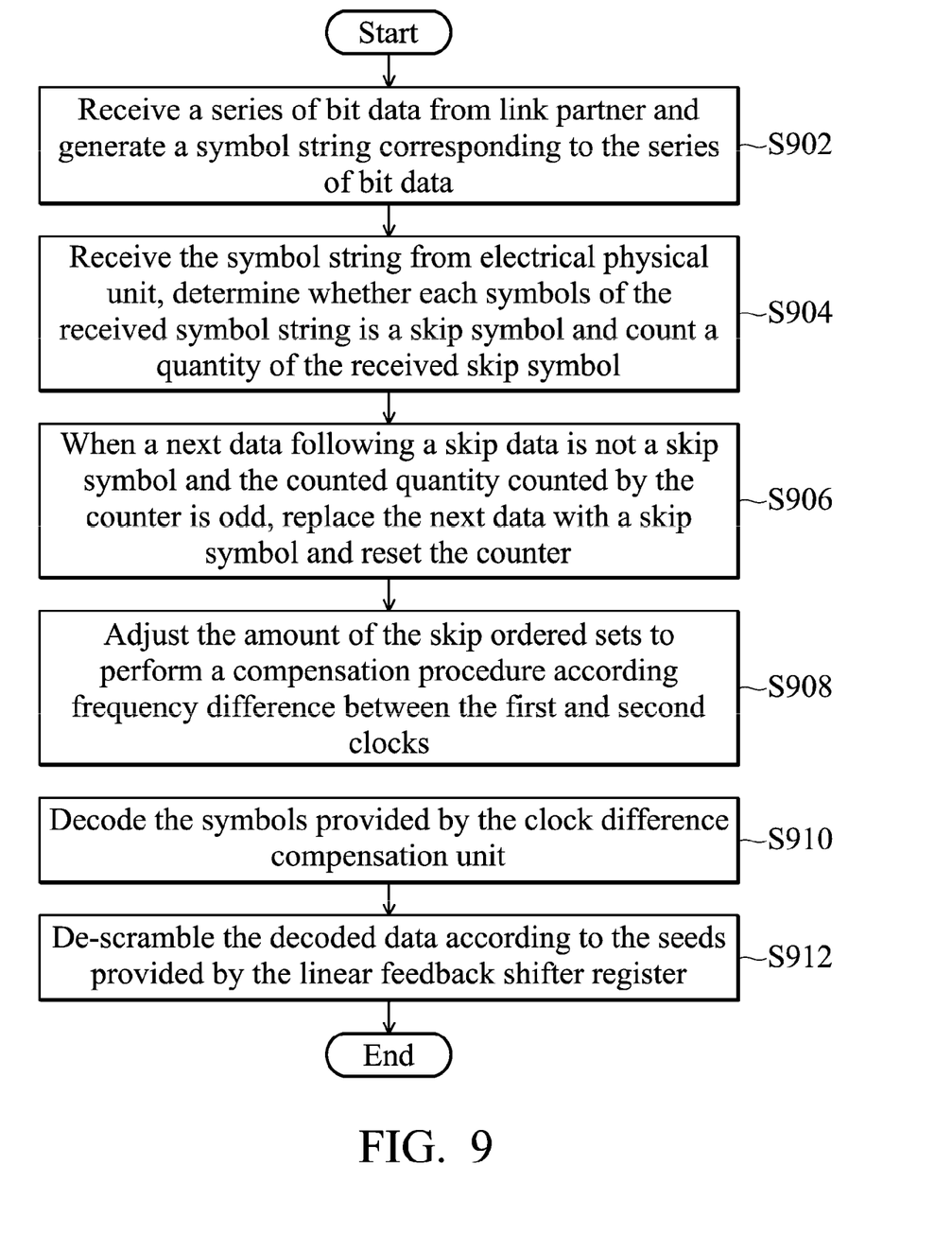
FIG. 9 shows a correction method according to an embodiment of the invention.

FIG. 9 shows a correction method for the USB device 40 with the first clock of FIG. 5 according to an embodiment of the invention. Referring to FIG. 5 and FIG. 9 together, first, the electrical physical unit 24 receives a series of bit data from the link partner 10 and generates a symbol string corresponding to the series of bit data (step S902), wherein the link partner 10 has the second clock and the symbol string includes a plurality of symbols. Next, the correction unit 41 receives the symbols of the symbol string from the electrical physical unit 24 in sequence, determines whether each symbols of the received symbol string is a skip symbol and counts a quantity of the received skip symbol (step S904). Next, when the correction unit 41 determines that a next data following a skip data is not a skip symbol and the counted quantity counted by the counter 42 is odd (e.g. 1, 3, 5, 7, etc.), the correction unit 41 replaces the next data with a skip symbol and resets the counter 42 to 0, for example, so as to re-count the quantity of the received skip symbols (step S906). Next, when the first and second clocks have a large frequency difference, the clock difference compensation unit 26 performs a compensation procedure by adjusting the amount of the skip ordered sets from the correction unit 41 (step S908). Next, the symbols provided by the clock difference compensation unit 26 are decoded by the decoder 23 (step S910). Next, the decoded data are de-scrambled by the de-scrambler 22 according to the seeds provided by the linear feedback shifter register 25, and then the de-scrambler 22 provides the de-scrambled data to the processing unit 21 for subsequent processing (step S912), wherein the linear feedback shifter register 25 determines whether to update the seeds according to the decoded data.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. A universal serial bus (USB) device with a first clock for receiving data from a link partner, comprising:
    an electrical physical unit coupled to the link partner via a cable, receiving a series of bit data from the link partner and generating a symbol string corresponding to the series of bit data, wherein the symbol string comprises a plurality of symbols;
    a correction unit coupled to the electrical physical unit, receiving the symbol string, determining whether each symbol of the received symbol string is a first type symbol and counting a quantity of the received first type symbol, wherein when the counted quantity is odd and a next received symbol is a second type symbol, the next received symbol is replaced with the first type symbol by the correction unit, wherein the first type symbol is a skip symbol.

2. The USB device as claimed in claim 1, further comprising:
    a decoder, decoding the symbol from the correction unit to generate a decoded data; and
    a de-scrambler, de-scrambling the decoded data according to a seed and comprising:
        a linear feedback shifter register, providing the seed according to a specific look-up table, and updating the seed when the decoded data corresponds to the second type symbol.

3. The USB device as claimed in claim 2, wherein the linear feedback shifter register stops updating the seed when the decoded data corresponds to the first type symbol.

4. The USB device as claimed in claim 2, wherein the linear feedback shifter register initializes the seed when the decoded data corresponds to the second type symbol and the second type symbol is a correction symbol.

5. The USB device as claimed in claim 4, wherein the link partner comprises a scrambler, and the link partner transmits the correction symbol to synchronize a linear feedback shifter register of the scrambler and the linear feedback shifter register of the de-scrambler.

6. The USB device as claimed in claim 1, wherein the link partner transmits even numbers of the first type symbols to the electrical physical unit between a first packet and a second packet.

7. The USB device as claimed in claim 2, further comprising:
    a clock difference compensation unit coupled between the correction unit and the decoder, adjusting an amount of the first type symbol to compensate for a clock difference between the first clock and a second clock of the link partner.

8. The USB device as claimed in claim 7, wherein the clock difference compensation unit increases the amount of the first type symbol to compensate for the clock difference when frequency of the first clock is larger than that of the second clock, and the clock difference compensation unit decreases the amount of the first type symbol to compensate for the clock difference when the frequency of the first clock is smaller than that of the second clock.

9. The USB device as claimed in claim 1, wherein the correction unit comprises a counter for counting the quantity of the successively received first type symbols.

10. The USB device as claimed in claim 9, wherein the correction unit resets the counter when the next received symbol is replaced with the first type symbol.

11. A correction method for a universal serial bus (USB) device with a first clock, comprising:
    receiving a series of bit data from a link partner and generating a symbol string corresponding to the series of bit data, wherein the symbol string comprises a plurality of symbols;
    receiving the symbol string, determining whether each symbol of the received symbol string is a first type symbol and counting a quantity of the received first type symbol, wherein the first type symbol is a skip symbol; and
    replacing a next received symbol with the first type symbol when the next received symbol is a second type symbol and the counted quantity is odd.

12. The correction method as claimed in claim 11, further comprising:
    decoding the symbol to generate a decoded data; and
    de-scrambling the decoded data according to a seed.

13. The correction method as claimed in claim 12, wherein the step of de-scrambling the decoded data further comprises:
    providing the seed according to a specific look-up table, and updating the seed when the decoded data corresponds to the second type symbol; and
    stopping updates to the seed when the decoded data corresponds to the first type symbol.

14. The correction method as claimed in claim 13, wherein the step of de-scrambling the decoded data further comprises:
    initializing the seed when the decoded data corresponds to the second type symbol and the second type symbol is a correction symbol.

15. The correction method as claimed in claim 11, wherein even numbers of the first type symbols are transmitted between a first packet and a second packet by the link partner.

16. The correction method as claimed in claim 12, further comprising:
    adjusting an amount of the first type symbol to compensate for a clock difference between the first clock and a second clock of the link partner.

17. The correction method as claimed in claim 16, wherein the step of adjusting the amount of the first type symbol further comprises:
    increasing the amount of the first type symbol to compensate for the clock difference when frequency of the first clock is larger than that of the second clock; and
    decreasing the amount of the first type symbol to compensate for the clock difference when the frequency of the first clock is smaller than that of the second clock.

18. The correction method as claimed in claim 11, wherein the step of counting the quantity of the received first type symbol further comprises:
    counting a quantity of the successively received first type symbols.

19. The correction method as claimed in claim 11, further comprising:
    re-counting the quantity of the received first type symbols when the next received symbol is replaced with the first type symbol.

20. The USB device as claimed in claim 1, wherein the correction unit re-counts the quantity of the received first type symbols when the next received symbol is replaced with the first type symbol.

* * * * *